(12) United States Patent
Croll et al.

(10) Patent No.: US 10,676,648 B2
(45) Date of Patent: Jun. 9, 2020

(54) SWITCHABLE ADHESION

(71) Applicant: NDSU RESEARCH FOUNDATION, Fargo, ND (US)

(72) Inventors: Andrew B. Croll, West Fargo, ND (US); Jared Michael Risan, Bloomington, MN (US); Fardad Azarmi, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 499 days.

(21) Appl. No.: 15/358,630

(22) Filed: Nov. 22, 2016

(65) Prior Publication Data

US 2017/0073549 A1 Mar. 16, 2017

Related U.S. Application Data

(63) Continuation of application No. PCT/US2015/032122, filed on May 22, 2015.

(60) Provisional application No. 62/002,207, filed on May 23, 2014.

(51) Int. Cl.
*C09J 7/00* (2018.01)
*C09J 5/00* (2006.01)
*C09J 7/22* (2018.01)

(52) U.S. Cl.
CPC . *C09J 7/22* (2018.01); *C09J 5/00* (2013.01); *C09J 2205/302* (2013.01)

(58) Field of Classification Search
CPC ......... C09J 7/00; C09J 7/20; C09J 7/22; C09J 5/00
See application file for complete search history.

(56) References Cited

U.S. PATENT DOCUMENTS

| 5,693,911 A | 12/1997 | Sydow |
| 2007/0251648 A1 | 11/2007 | Northen et al. |
| 2010/0000991 A1 | 1/2010 | Henry et al. |
| 2011/0215157 A1* | 9/2011 | Ho ...................... E05B 15/1607 235/492 |
| 2011/0265949 A1 | 11/2011 | Burch |

OTHER PUBLICATIONS

NDSU Research Foundation, PCT/US15/32122 filed May 22, 2015 "The International Search Report and the Written Opinion of the International Searching Authority" dated Aug. 12, 2015, 7 pages.

* cited by examiner

*Primary Examiner* — Jacob T Minskey
*Assistant Examiner* — Matthew Hoover
(74) *Attorney, Agent, or Firm* — McKee, Voorhees & Sease, PLC

(57) ABSTRACT

Switchable adhesion devices, systems and methods are provided. A switchable adhesion component includes a switchable body. At least one portion of the body is adapted to carry an adhesive layer and another portion a load. At least a portion of the body is switchable between one or more varying states without imparting change to the surface chemistries or area at the adhesive joint.

8 Claims, 10 Drawing Sheets

SWITCHABLE ADHESION

CROSS REFERENCE TO RELATED APPLICATIONS

This application is a continuation of PCT/US2015/032122, filed May 22, 2015, which claims priority under 35 U.S.C. § 119 to provisional application U.S. Ser. No. 62/002,207 filed May 23, 2014, herein incorporated by reference in their entirety.

BACKGROUND

I. Field of the Disclosure

The present disclosure relates to switchable adhesion. More specifically, but not exclusively, the present disclosure relates to devices, methods and systems for controlling adhesion with one or more compliance switching mechanisms.

II. Description of the Prior Art

The adhesive market is an enormous, multi-billion dollar industry represented by varied approaches for creating different products and fulfilling various niches. Adhesives and adhesives processes are generally governed by a simple balance of energies. There is energy stored in the adhesive bonds formed between two surfaces, and potential energy stored in a load that is held with the adhesive. The adhesive energy is typically the focus of adhesion research and product development. For example, if a weight of a certain size (the load) is intended to be held by an adhesive it is customary to optimize the amount or chemical nature of the adhesive used. Chemical bonding is material specific so a chemist is often tasked with creating new molecules to meet particular adhesive requirements or aspirations. Similarly, if inadequate adhesive exists, the size of the load would simply dictate the amount of contact that is needed between surfaces at an adhesive joint. These two options are most often targeted in the design, development and commercialization of a switchable adhesion system, device or method, such as those that switch the interfacial chemistry or change the amount of contact between the two surfaces at an adhesive joint.

Generally speaking, adhesives include an adhesive layer and a backing component or backing layer. An example can include a Post-It® note or Scotch® tape. With tape, the backing is made out of cellophane which is coated with an adhesive layer and with the sticky note the backing is made out of paper which includes an adhesive layer. Although provided simply as examples, adhesion development, research and commercialization often focuses on the adhesive layer or system thereby overlooking the backing as a critical component of adhesives, particularly relating to switchable adhesion and adhesive devices, methods and systems.

Much of the development and progress in adhesives to date has been focused on the adhesive layer as opposed to the backing of the adhesive layer; thus, the adhesive layer may not provide the most opportunity for increasing the functionality or performance of existing adhesives, adhesive systems and switchable adhesives.

Despite the popularity of today's adhesives, adhesive systems and switchable adhesives, they still have many limitations. As such, a new generation of adhesives, adhesive systems and adhesion switches focused on the backing component or layer represent significant advancements on numerous fronts.

SUMMARY

The present adhesive, adhesive system and switchable adhesive overcome short comings and disadvantages of prior designs by creating switchable adhesion and adhesion control in the backing component of an adhesive, adhesive system or adhesive switch.

The ability to actually control adhesion in the backing of an adhesive, adhesive system and adhesion switch allows the devices, methods and systems of the present disclosure to be easily adapted for or retrofitted to existing adhesives, adhesive systems and switches. Among the resulting benefits is the immediate ability to add functionality or retrofit an existing adhesive, adhesive system or adhesion switch with control over the adhesive strength as a result of changes to the backing component or layer. Another advantage of focusing on the backing layer or component is the ability to leverage existing adhesives/adhesive layers that provide the best bonding to various surfaces in the devices, methods and systems of the present disclosure originate exclusively from the backing component or layer of an adhesive, adhesive system or adhesion switch.

Regardless of the adhesive layer or independent of the adhesive layer, the devices, methods and systems of the present disclosure are directed at controlling adhesion by switching from a high adhesive force capacity state to a low adhesive force capacity state originating in the backing component or layer of an adhesive, adhesive system or adhesion switch.

One exemplary embodiment provides a switchable adhesion system. As an example, the system can include a switchable adhesion component having sides forming a switchable body. At least one of the surfaces of the body can include an adhesion surface configured to carry an adhesive layer and another surface of the body configured to carry a load. At least a portion of the body can be configured with an adhesion switch to switch between one or more varying states, such as states of stiffness. The adhesion surface is generally planar in the one or more varying states of stiffness of the switchable body.

Another embodiment provides a method for a switchable adhesion system. By way of example, a switchable body is provided with a generally planar adhesion surface configured to carry an adhesive layer and another surface configured to carry a load. By switching a property of at least a portion of the body between one or more states the generally planar adhesion surfaces alter between one or more varying states of force capacity as a result of switching between one or more property states in the switchable body.

BRIEF DESCRIPTION OF THE DRAWINGS

Illustrated embodiments of the present disclosure are described in detail below with reference to the attached drawing figures, which are incorporated by reference herein, and where.

DETAILED DESCRIPTION

Figure 1A:
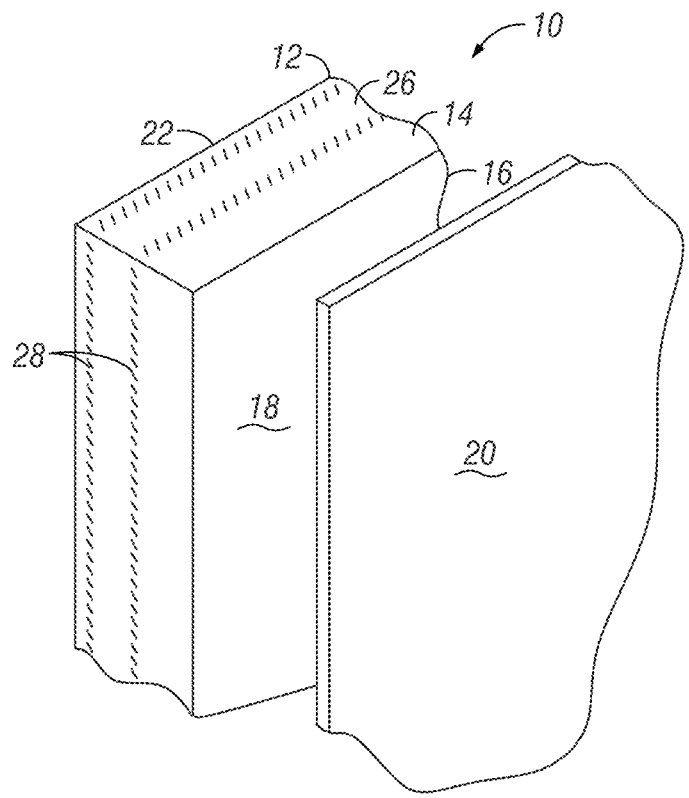
FIGS. 1A-C are pictorial representations of adhesion devices and systems in accordance with an illustrative embodiment.

The present disclosure is directed to switchable adhesion and more specifically to devices, methods and systems for controlling adhesion using one or more compliant switching mechanisms. Previously, the focus, research and commercialization of those efforts were directed to the adhesive layer, such as optimizing the contact surface, surface area and surface chemistry of the adhesive layer. The present disclosure has as one of its main objects, features and advantages a focus on the backing layer, or in other words a device, method or system that operates behind the adhesive or adhesive layer. This, for example, can be accomplished by one or more of the methods, systems or devices of the present disclosure for switching an adhesive from a high adhesive force capacity state to that of a low adhesive force capacity state or from a low adhesive force capacity state to that of a high adhesive force capacity state. In other words, a device, method and system are provided for turning on or off adhesion, such as by a flip of a switch. Alternatively, the device, method and system can gradually change adhesion (e.g., gradually, incrementally, or immediately dial up/down the adhesion) from a weaker to stronger adhesion or a stronger to weaker adhesion. Whereas others have focused on the adhesive layer and the precise details of the two surfaces that are to be adhesively bonded, the present disclosure is more broadly applicable as it is not limited by or constrained to modifying the adhesive surface, but rather focuses primarily on the backing component of an adhesive (see FIGS. 1A-C). In another aspect, the concepts, devices, methods and systems of the present disclosure can be configured within a switchable body carrying an adhesive layer and a switchable body carrying both a backing layer or component and an adhesive layer carried by the backing layer or component. Thus, the devices, methods and systems of the present disclosure are readily adaptable and configurable for retrofitting existing adhesive systems, such as those that have an adhesive layer carried by a backing component or layer. In another aspect, the devices, methods and systems of the present disclosure can be configured to include a switchable body for carrying out the intended objects, features and advantages of the present disclosure, where the switchable body can carry one or more layers of adhesive. In this manner the switchable body can take the place of existing backing components or layers for various types of adhesives or, as previously discussed, can be configured on the back side of a backing component or backing layer that carries one or more adhesive layers. In this manner, the devices, methods and systems of the present disclosure can operate independent of existing adhesive layers or as a retrofit for existing adhesive layers. Description and details as to how this is to be accomplished are provided in the accompanying description making reference to one or more of the attached drawing figures in accordance with one or more contemplated aspects or embodiments.

Figure 1B:
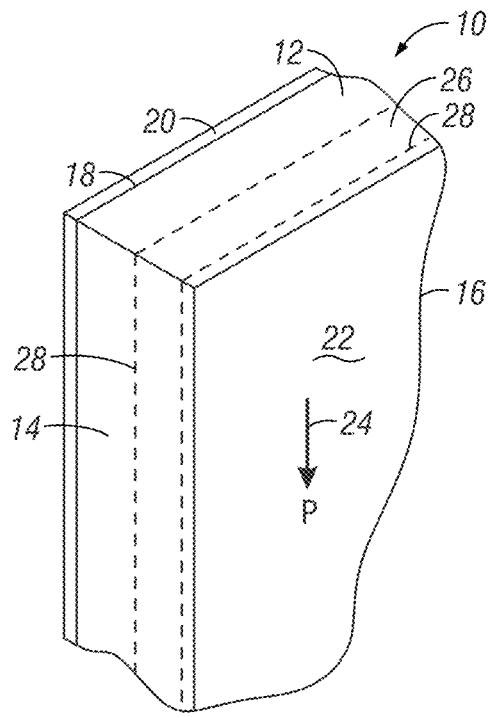
Figure 1C:
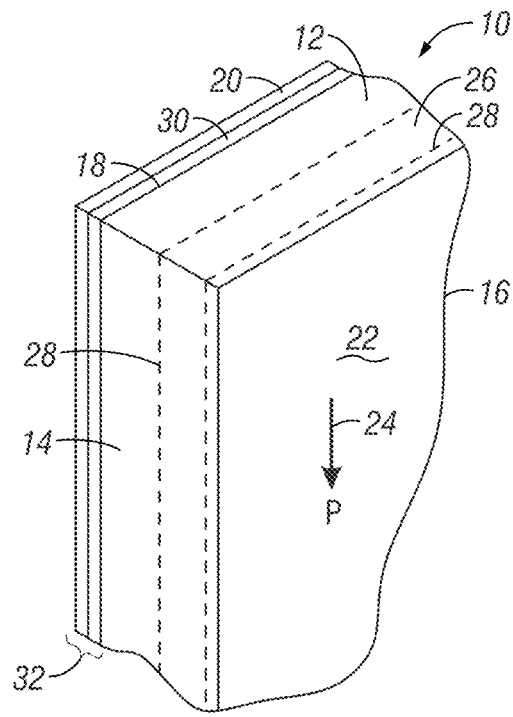
Figure 2:
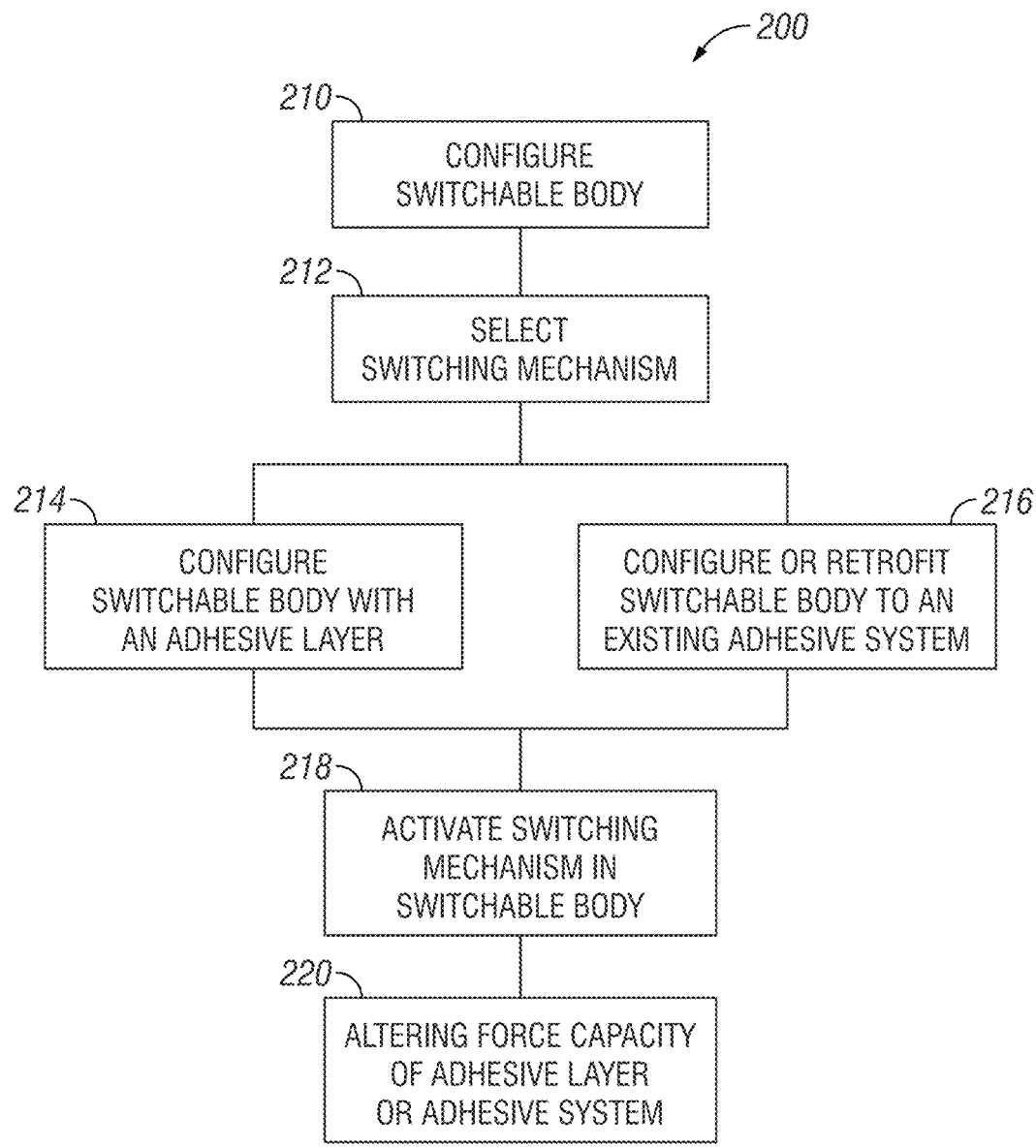
FIG. 2 is a pictorial representation of a flowchart for an adhesion switching method in accordance with an illustrative embodiment.

FIG. 2 provides an exemplary flowchart as a pictorial representation of the adaptability for the devices, methods and systems of the present disclosure. According to one method 200 of the present disclosure, a switchable body 210 is configured. One or more types of switching mechanisms 212 can be selected for configuring the switchable body 210 with a switching mechanism 212. Generally speaking, the switching mechanism 212 can include any mechanism that allows the switchable body to be switched between one or more varied states, varied properties or varied conditions. In one example, stiffness of the switchable body can be varied. Various switching mechanisms 212 are contemplated and set forth further herein. According to one implementation of the devices, methods and systems of the present disclosure, the switchable body is configured with an adhesive layer 214. Thus, the switchable body 210 acts as the backing component or backing layer to the adhesive layer 214. In another aspect of the present disclosure, the switchable body can be configured or retrofitted to an existing adhesive 216 layer. An existing adhesive, as discussed herein, can include 1. an adhesive component or layer, or 2. a backing component or layer with an adhesive component or layer. The switchable body can be configured or retrofitted to an adhesive with, for example, a backing component carrying an adhesive layer. To control adhesive switching, the switching mechanism is activated in the switchable body 218. By actuating the switching mechanism the switchable body 218 alters the force capacity 220 of the adhesive layer, backing or component 214 or existing adhesive 216. Exemplary illustrations of a switchable body 16 with an adhesive layer 20 are provided by pictorial representations in FIGS. 1A and 1B. Similarly, an exemplary representation of a switchable body 16 retrofitted or configured to an existing adhesive system 32 is pictorially represented in FIG. 1C. Further details and description of FIGS. 1A-C are covered herein.

As a general rule, adhesive processes are governed by a simple balance of energies. Energy is stored in the adhesive bonds formed between two surfaces at the adhesive joint, and potential energy is stored in a load, such as the load pictorially represented in FIGS. 1B and 1C, that it is held with the adhesive. The adhesive energy is typically the focus of adhesion research as previously discussed herein. For example, if a weight of a certain size (i.e., the load 24) is intended to be held by an adhesive it would be typical to optimize the amount or chemical nature of the adhesive or adhesive layer 20. Chemical bonding is material specific so a chemist can create new molecules to meet particular adhesive goals. Alternatively, if an adequate adhesive is already available, the size of the load (see for example load 24 in FIGS. 1B and 1C) would simply dictate the amount of contact or contact area that is needed. Either of these two options could be targeted in the design of a switchable adhesive; however, devices of this nature that switch the interfacial chemistry have been contemplated, developed and commercialized as have devices that change the amount of contact between the adhesion surfaces. Therefore, it is a primary object, feature and advantage of the present disclosure to focus on the backing component or one or more layers that carry an adhesive layer or component.

It has been shown how a set of minimal assumptions can lead to a remarkably robust prediction of adhesive force capacity, F, of an adhered object. One mechanical model predicts that, $$F \sim \sqrt{\frac{G_C A}{C}} \quad (1)$$

where A is the true contact area, $G_C$ is the critical energy release rate and C is the compliance of the adhesive joint. Equation 1 is shown to fit both synthetic adhesives and data from biological climbers both on the organism scale and on the single fibre scale. The scaling relation fits numerous contact geometries over thirteen orders of magnitude in adhesive force, and thus is applicable to the varied devices, methods and systems of the present disclosure.

Mechanisms that switch from a state of low adhesive force capacity to a state of high adhesive force capacity either are consistent with the scaling of Equation 1 or have a mechanism that breaks one of the assumptions used to derive this relation. For example, switching surface chemistry directly relates to a change in critical energy release rate; a high $G_C$ leads to a high force capacity, a low $G_C$ leads to a low force capacity. Switching between low and high contact area is both intuitive and accounted for in scaling. Alternatively, the peal used by a biological climber alters geometry in a way that negates the applicability of Equation 1 as the peal angle increases from 0°. Notably, the scaling does work for a 0° peal, otherwise known as a lap-shear geometry.

Thus, the compliance of an adhesive device is one mechanical means to control adhesive force capacity. In particular, a lap-shear geometry can be used as one exemplary process for demonstrating how immobilizing a material leads to decrease compliance and increased adhesive force capacities. A part or portion of an adhesive backing or layer, such as the switchable body 16 shown in FIGS. 1A-C, can be immobilized as a result of a switching mechanism, effectively decreasing the freely deformable length and consequently increasing the stiffness of the switchable body 16. Notably, the contact area and the interfacial energy of the contact region at the adhesive layer 20 is effectively unchanged.

Turning now with specific focus on the pictorial representations provided in FIGS. 1A-C, one or more devices, methods and systems of the present disclosure are addressed. For purposes of illustration, the renderings provided in FIGS. 1A-C are redacted with the understanding that the dimensions (e.g., length, width, height, etc.) could vary amongst the various devices, methods and systems of the present disclosure. In one distillation of the concepts of the present disclosure, a switchable adhesion system 10 is pictorially represented, for example, in FIGS. 1A and 1B, and another variation of the system 10 in FIG. 1C. In one aspect, the system 10 includes a switchable adhesion component 12. The switchable adhesion component 12 includes one or more sides 14 that together form a switchable body 16. At least one of the surfaces of the switchable body is an adhesion surface 18 adapted to carry an adhesive layer 20. For purposes of illustration in FIG. 1A, the system 10 is shown in an exploded view whereby the adhesive layer 20 is separated from the adhesion surface 18 of the switchable body 16 for purposes of better illustrating and identifying the adhesion surface 18 of the switchable body 16. FIG. 1A provides a pictorial representation of the adhesive layer 20 being carried by the adhesion surface 18 of the switchable body 16 as would be customary for at least one particular aspect of the present disclosure. The switchable body 16 also includes another surface 22 configured to carry a load 24 or bare a force acting on the system 10. At least a portion 26 of the body 16 is configured with a switching mechanism 28 represented by the dashed lines on sides 14 of the body 16. The switching mechanism 28 can be configured to occupy the entirety of the switchable body 16 or a portion 26 of the body 16. In one aspect, the switching mechanism 28 can occupy a portion 26 adjacent the adhesion surface 18 or adjacent the other surface 22. In other words, the portion 26 of the body 16 having the switching mechanism 28 can be at the back of the body or the front of the body or occupying an entirety of the body. The switching mechanism 28 is not configured, implemented nor does it originate within the adhesive layer 20. In other words, the switching mechanism itself does not change the surface area, surface chemistries or contact adhesive of the adhesive layer 20.

The switching mechanism 28 carried by the body 16 is configured to alter a property of the body 16 when actuated. For example, in one aspect, the switching mechanism 28 switches the body 16 between varying states of stiffness. The switching mechanism 28 can be configured to alter other properties, features and parameters of the body 16. Various types of switching mechanisms 28 are contemplated and discussed. Suffice it to say, any switching mechanism 28 that is capable of altering or switching a property of the body 16 between varying states and stages (e.g., between a restrained and unrestrained state) can be implemented in the devices, methods and systems of the present disclosure. As an example, FIG. 1A provides a pictorial representation of a switching mechanism 28 in a portion 26 of the body 16. The diagonally dashed lines in FIG. 1A represent one state or condition of the switching mechanism 28 and the dashed lines in FIGS. 1B and 1C represent another state or condition of the switching mechanism 28. Upon switching, the switching mechanism 28 changes between the state or condition pictorially represented in FIG. 1A to the state or condition pictorially represented in FIGS. 1B and 1C. Switching the switching mechanism 28 from the condition or state represented in FIG. 1A to that represented in FIGS. 1B and 1C results in a change in one or more properties of the switchable body 16 carrying adhesive layer 20 in the embodiment pictorially represented in FIG. 1B and the adhesive system 32 represented pictorially by the embodiment shown in FIG. 1C. For example the switching mechanism 28 can result in a change in the stiffness of the body 16. The dashed lines in FIGS. 1B and 1C can represent a change in the stiffness of the switching mechanism 28 from the stiffness represented by the diagonally dashed lines shown in FIG. 1A. The change in the property (e.g., stiffness) of the switchable body 16 alters the force capacity of the adhesive layer 20 shown in FIG. 1B or the existing adhesive system 32 shown in FIG. 1C. Although stiffness is used as an example, it is merely for the purposes of illustration and is not indicative or limiting to the various types of parameters relating to the properties of the switchable body 16 that can be controlled by the switching mechanism 28.

As discussed, FIG. 1B provides a pictorial representation of a system 10 having a switchable body 16 carrying an adhesive layer 20. The switchable body 16 can carry a load 24 as discussed. In another aspect, as pictorially represented in FIG. 1C, the system 10 includes a switchable body 16 configured or retrofitted to an existing adhesive system 32 that includes an adhesive layer 20 and a backing component or layer 30. Existing adhesives typically include an adhesive layer 20 and a backing component or layer 30 as discussed. The switchable body 16 of system 10 can be retrofitted or configured to operate in cooperation with existing adhesives such as adhesive system 32. As with other embodiments, the switchable body includes a switching mechanism 28 that controls, changes or alters one or more physical properties of the switchable body thereby imparting switch adhesion control features to the existing adhesive system 32 by constraining or unconstraining, depending upon the position of the switching mechanism 28, one or more parts, portions or features of the existing adhesive system 32 such as the backing component or layer 30.

Although altering stiffness of the switchable body is mentioned herein, other properties of the switchable body 16 are contemplated for switching the adhesive layer 20 or existing adhesive system 32 from a state of low adhesive force capacity to a state of high adhesive force capacity. Properties of the switchable body 16 that can be altered include, for example, compressive strength, ductility, fatigue limit, flexural modulus, flexural strength, fracture toughness, hardness, plasticity, resilience, sheer modulus, sheer strength, specific modulus, specific strength, specific weight, tensile strength, yield strength, Young's modulus, coefficient of restitution, hardness, stiffness, permeability, electrical conductivity, surface tension, etc. This list is not meant to be an exhaustive list of the properties that can be altered or switched in the body 16 as a result of the switching mechanism 28. Any transformation, change or alteration of a property of the body 16 resulting in more or less constraint of the adhesive layer 20 or adhesive system 32 carried by the body 16 are contemplated. Thus, the switching mechanism 28 can be used to alter, change or otherwise effect compliance at the adhesive layer 20 or in the adhesive system 32 for switching from a state of low adhesive force capacity to a state of high adhesive force capacity in the adhesive layer 20 or the adhesive system 32 without changing the overall contact area or the surface chemistries of the adhesive layer 20 or adhesive system 32. For example, the adhesive surface 18 of the switchable body 16 does not experience a change in surface area or topography as a result of the switching mechanism 28 and therefore does not impart a change in the contact surface area of the adhesive layer 20 or the adhesive system 32 at the adhesive joint. This is to distinguish from other systems that impart changes to the surface area or topography of the adhesive layer 20 or adhesive system 32 as a result of changes in the adhesion surface. Others have changed the surface area of the adhesive layer 20 at the adhesive joint (i.e., the bond between the adhesive layer 20 and the adjoining surface) by changing the amount of contact between the two surfaces, such as by imparting a change in the amount of surface area and contact between the two surfaces by altering the profile, shape or surface contour/topography of the adhesion surface 18. The devices, methods and systems of the present disclosure function and operate independent of making changes to the amount of surface area in contact between the two surface at the adhesive joint and are focused on creating a switching mechanism that results in a change in one or more of the properties of the switchable body 16 behind the adhesive layer 20 or adhesive system 32. Thus, the present disclosure differs from those who have attempted to alter the chemistry or alter the amount of contact between the surfaces at the adhesive joint as the present disclosure has as one of its several objects, features and advantages the working, operating or otherwise controlling adhesion switching from behind the adhesive layer 20 or the adhesive system 32. This can be accomplished, for example, by imparting a physical change in the switchable body 16 that affects or otherwise limits or prevents changes from occurring (e.g., deformation of the adhesive layer 20 or adhesive system 32) in the adhesive layer 20 or adhesive system 32 and without effecting the surface chemistries or amount of contact between the two surfaces at the adhesive joint. One example as discussed herein, includes altering the stiffness of the switchable body 16 by switching the switching mechanism 28 in at least a portion 26 of the switchable body 16 between varying states of stiffness. The greater the stiffness in the switchable body 16 the greater the constraint imparted to the adhesive layer 20 or adhesive system 32, which results in a higher adhesive force capacity. Conversely, a lower stiffness in the body 16 imparts less constraint to the adhesive layer 20 or the adhesive system 32, which results in a lower adhesive force capacity. The switching mechanism 28 allows the switchable body 16 to change between varying states for one or more properties of the switchable body 16 such as varying states of stiffness or varying other properties as discussed. Thus, the system 10 can effectively switch adhesion on and off, instantly, gradually or incrementally, as a result of switching the switching mechanism 28 in at least a portion of the switchable body 16 which thereby imparts or has a switching effect on the adhesive layer 20 or adhesive system 32.

Chemical Switches

Chemical functionality can be used to switch adhesion by directing molecular interactions through hydrogen bonding, electrostatic or hydrophobic interactions. Materials that are chemically switched can have a transformation in material properties induced by external stimuli such as a change in solvent quality, pH, temperature, electric or biochemical environment. Chemical adhesive switches are numerous, as such only a few are specifically discussed. Notwithstanding, the present disclosure contemplates the use of any type of chemical switch for the switching mechanism 28. One caveat with chemical switches is that they can be slow, interface specific and highly environmentally sensitive which can discourage their general adoption by industry and others. What follows is a discussion of a few possible chemical switches that are contemplated switching mechanisms 28.

Thermal-Chemical Switching

Phase transition between an ordered and disordered state in a fluorinated liquid crystal polymer adhesive can switch adhesive state by means of temperature change. In the ordered state (cool) a copolymer only weakly interacts with a surface, but upon heating the polymer switches to a tacky state. The smectic fluorinated liquid crystal polymer adhesives undergoes a lamellar-to-isotropic, first-order phase transition at 35° C. The nature of a first-order phase transition allows a narrower switching window compared to melting a glass forming material. In the smectic phase (hard, non-wetting) no energy is measured when separating the probe and the adhesive. After the smectic-to-isotropic phase change, the adhesion energy jumps. The transition temperature of the adhesive could be tailored by alternating the length of the pendant side chains on the polymer. Although provided here as an example only, thermal-chemical switching can be used to change a property of the switchable body 16 and thereby create a switch in the switchable body 16 as discussed. In at least one embodiment, thermal-chemical switching can be used to control stiffness, or any other property of the switchable body 16 contemplated herein.

Light-Chemical Switching

An acrylic pressure sensitive adhesive (PSA) has been shown to be capable of being switched off and removed through photoinitiated crosslinking caused by exposure to light. The acrylic adhesive copolymers used were itaconic anhydride, 2-ethylhexyl acrylate and n-butyl acrylate polymerized in ethyl acetate. The anhydride containing copolymer was modified with 2-hydroxyethyl methacrylate (HEMA) in toluene to create a methacrylate functional PSA. The PSA was further mixed with a visible light photoinitiator which ultimately produced a light sensitive adhesive. Upon irradiation to light, free radical cross-linking between vinyl groups occurred and an increase in hardness, and a reduction in adhesion, was measured. Peel strength tests showed that after irradiation of light, the adhesive peel strengths decreased by 90%. Although used by others to affect changes in the adhesive layer, the present disclosure contemplates that light-chemical switching could be used to control one or more properties of the switchable body 16, such as within the body or at the adhesion surface 18 to create a switching affect as discussed herein. In at least one embodiment, light-chemical switching can be used to switch on or off or otherwise control stiffness, or any other property of the switchable body 16 contemplated herein.

pH Switching

Adhesive changes with pH has been studied in waterborne poly (butyl acrylate-co-acrylic acid) [P(BuA-co-AA)] latex films. Latex films consist of a colloidal dispersion of core-shell particles that when dry, created a honeycomb structure. The particle surface, consisting of carboxylic acid groups, can be pH responsive. As the solution pH increases from acidic to basic, the drying kinetics changes and alters the adhesive properties of the latex films (e.g., adhesion properties of an adhesive layer). When the pH is low, the carboxylic acid is not dissociated and (in the absence of water) contributes to hydrogen bonding with other surfaces. When the pH was high, the groups are deprotonated creating negatively charged ionized groups that can be balanced with counterions ultimately creating neutral dipoles.

Adhesion measurements between a PDMS hemisphere coated with a polyelectrolyte multilayer (PEM) and a rigid substrate is also of interest. The measurements can be performed in various solutions of controlled pH. In one example, others have coated a PDMS probe with aqueous solutions of poly (allylamine hydrocholoride) (PAH) and poly (acrylic acid) (PAA) by repeated dipping in either solution. Dipping is repeated until a desired layer-by-layer (LBL) coating thickness is attained. Glass slides and silicon wafers can be treated with 3-aminopropyltriethoxysilane (APTES) and used as substrates for adhesion measurements between the coated PDMS-PEM hemisphere and the amine-functionalized substrates.

Adhesion measurements performed in both air and pH solutions could include either NaCl or HCl at a pH of 5.5 or 3.0 as done by others. Studies have shown that the coatings swell substantially and plasticize when exposed to aqueous solutions. The swelling and plasticization inhibits intimate contact because of increased surface roughness and an elevated coating modulus. The decrease in contact area decreases the overall adhesion between the coating and substrate and shows that pH could be used as a switch to turn off adhesion in an adhesive layer. Although used by others to affect changes in the adhesive layer, the present disclosure contemplates that pH switching could be used to control one or more properties of the switchable body 16 set forth herein, such as within the body or at the adhesion surface 18 to create a switching affect. In at least one embodiment, pH switching can be used to control stiffness, or any other property of the switchable body 16 contemplated herein.

Solvent Switching

The pH switches are suggestive of a more general class of switch, one that is simply responsive to its solvent environment. Others have introduced a two-level structured switchable adhesives that change surface morphology and surface properties when exposed to selective solvents. Adhesive samples have been manufactured with a primary needle like structure on a micron length scale through plasma etching of poly (tetrafluoroethylene) (PTFE). A secondary structure has been created with an ammonia plasma treatment. The ammonia plasma treatment covalently introduced hydroxyl and amino end functional groups onto the roughed up PT FE. Spin-coating introduced carboxylterminated poly (styrene-co-2,3,4,5,6-pentafluorostyrene) (PSF-COOH) and carboxyl-terminated poly (2-vinylpyridine) (PVP-COOH) to the roughed up PTFE. The adhesive when exposed to organic solvent, roughens the surface, or to water smooths the surface. Roughened surfaces were found to have a significantly decreased adhesive force capacity.

Others have created a solvent switchable substrate for a hydrophilic PSA. When the substrate is exposed to selective solvents, the adhesion and wetting properties of the interface between the substrate and the hydrophilic PSA are altered. Tackiness and wettability changes of the PSA on the polymer brush substrate have been verified by probe tack and contact angle measurements. The substrate was a silicon surface grafted with bicomponent polystyrene-poly (2-vinyl-pyridine) (PS-P2VP). The hydrophilic PSA consisted of a blend of poly (vinyl-pyrrolidonc)-poly(ethylene glycol) (PVP-PEG). The bicomponent substrate was composed of moderately polar and a polar component which could be switched from a hydrophilic to hydrophobic state depending on a solvent pretreatment. Although used by others to affect changes in the adhesive layer, the present disclosure contemplates that solvent switching could be used to control one or more properties of the switchable body 16, such as within the body or at the adhesion surface 18 behind the adhesive layer 20 to create a switching affect. In at least one embodiment, solvent switching can be used to control stiffness, or any other property of the switchable body 16 contemplated herein.

Surface Area Switches

The second main area of adhesive switching research has focused on the amount, as opposed to quality, of surface contact. While intuitive no contact means no adhesion—these designs tend to be complex, difficult to manufacture and expensive. Highlighted are several devices which focus on altering adhesion by changing the amount of true contact between the adhesive and the substrate (i.e., contact at the adhesive joint). What follows is a discussion of a few surface area switches that are contemplated switching mechanisms 28.

Thermal-Activated Surface Switching

Thermosensitive switchable adhesive have been developed. The bio-inspired switchable adhesives consist of gecko like fibrillar patterns of shape memory thermoplastic elastomers. Shape memory polymers (SMP) can be deformed into temporary shapes and then recovered to a predefined original shape upon heating through a transition temperature. In this case, heating of the shape memory polymer posts causes the posts to became compliant and temporarily tilts away from the surface. The thermal tilting effectively reduces the contact area and therefore decreases adhesion in the adhesive layer.

The adhesives were produced by a double molding process. Polydimethylsiloxane (PDMS) were cast into a lithographic master and then demolded. The demolded PDMS posts that were produced were then brought into contact and imprinted into a SMP (Tecoflex 720-cycloaliphatic polyetherurethane block copolymer) at an elevated temperature. Once cooled, the PDMS imprint were removed leaving behind a shape memory micropatterned adhesive that showed a 200 fold increase in adhesion in the adhesive layer.

Others have produced a thermally controlled reversible adhesive that consists of microfibrillar adhesive polymers on top of Shape Memory Polymer. Traditional, tacky adhesive were added to shape memory polymer posts. The system had slight curvature due to the high stiffness from the SMP and as a result poor adhesion at room temperature. Using an infrared light as a heat source, the sample could be heated above the glass transition temperature and conform to a substrate. After the heating stage a significant increase in adhesive force capacity was observed. The overall performance of adhesion between a glass probe and the device increased from 0.6 $J/m^2$ to 3.1 $J/m^2$ by increasing the cooling rate. Still others work studied alternate micro-structured adhesives however the complexity to produce the adhesives did not outweigh the adhesive performances. Although used by others to affect changes in the surface of the adhesive layer, the present disclosure contemplates that thermally-activated switching could be used to control one or more properties of the switchable body 16, such as within the body or at the adhesion surface 18 behind the adhesive layer 20 to create a switching affect. In at least one embodiment, thermal-activated switching can be used to control stiffness, or any other property of the switchable body 16 contemplated herein.

Magnetic Switching

An adhesive that could be switched in the presence of a magnetic field has also been developed. The adhesive relies on flexible nickel paddles which have hierarchical polymeric nano-rod cantilevers mounted on the surface. The nickel cantilevers and pads were fabricated by photolithography and etching. The polymeric nano-rods were created by random growth methods.

The mechanism for switching adhesion relied on a magnetic field which actuated the nickel cantilevers. While under the influence of a magnetic field, the nickel paddles reoriented themselves away from an adhering surface drastically reducing the contact area and changing the adhesion. Although used by others to affect changes in surface of the adhesive layer, the present disclosure contemplates that magnetic switching could be used to control one or more properties of the switchable body 16, such as within the body or at the adhesion surface 18 behind the adhesive layer 20 to create a switching affect. In at least one embodiment, magnetic switching can be used to control stiffness, or any other property of the switchable body 16 contemplated herein.

Electric Switching

A switchable electronically-controlled capillary adhesion device has been developed by others. Liquid is pumped through a hole with a low voltage pulse that facilitated electro-osmotic flow. Pumping continues until contact is made with the device and substrate. Switching adhesion off occurs when the liquid is retracted. Only modest adhesive strengths (13 $mN/cm^2$) were measured through force-transducer experiments, however it was theorized that downsizing could rival permanent adhesive strengths since more/ smaller droplets would be available to make contact. Although used by others to affect changes in the surface of the adhesive layer, the present disclosure contemplates that electric switching could be used to control one or more properties of the switchable body 16, such as within the body or at the adhesion surface 18 behind the adhesive layer 20 to create a switching affect. In at least one embodiment, electric switching can be used to control stiffness, or any other property of the switchable body 16 contemplated herein.

Elastic Instabilities

Elastic instability to switch a PDMS fibrillar array's contact area has also been investigated. The PDMS array was cured in a mold that was manufactured with photolithography and etching. To make the PDMS array wrinkle, the adhesive was stretched and then was placed in a UV-ozone exposure system. Once the strain was removed a sinusoidal adhesive sample remained. Upon stretching, the adhesion was turned on by orienting the fibrils normal to a substrate such that contact was maximized. When the stretch was released the film relaxed back into a wrinkled state and adhesive contact would be decreased. The stretchable adhesive worked well in both normal (I 0.8 $N/cm^2$) and shear modes (14.7 $N/cm^2$) [29].

Others have used surface wrinkles of an elastomer film to control adhesion. Switching was not demonstrated, but differences in strength were shown with different wrinkled substrates. The adhesives were manufactured by curing a layer of poly (n-butyl acrylate) (PnBA) on a substrate. Once cured, more (nBA) solution was poured onto the film which caused lateral swelling. The film was already cast onto a combined substrate therefore the addition of more (nBA) solution created surface wrinkles once a critical compressive stress surpassed an elastic stability. Finally the adhesives were UV cured. Adhesion was found to increase as the wavelength was decreased. Contact splitting was the mechanism by which the adhesion increased and was attributed to the increase in contact perimeter per area on the adhesive. An increase in contact perimeter per area increased the total contact area. Although used by others to affect changes in the adhesive layer, the present disclosure contemplates that elastic switching could be used to control one or more properties of the switchable body 16, such as within the body or at the adhesion surface 18 behind the adhesive layer 20 to create a switching affect. In at least one embodiment, elastic switching can be used to control stiffness, or any other property of the switchable body 16 contemplated herein.

Experimental

A considerable amount of effort has been directed towards understanding and mimicking the advanced adhesive traits observed in climbing organisms. The Tokay Gecko (gecko gecko) often serves as a model climbing organism, and therefore a significant effort has been devoted to the study of the locomotion and anatomy of the creature. Much of the engineering focus is geared towards relating many of the desirable features of biological adhesion (high force capacities, low energy loss, accommodation of surface roughness. self-cleaning and switching) to the complex fibrillar nanostructures that occur on the climbing limbs of many of these animals. For example, the hierarchical fibrillar structures in geckos begin with thin keratin "hairs' (setae) which branch into many smaller fibres (spatula) and terminate in nanoscale pads. The small size of the pads (~100 nm) allows intimate contact with a surface resulting in relatively high attachment forces through van der Waals interactions over a significant true contact area. The fibrillar structures have served as an inspiration for countless advanced adhesive devices, demonstrating the great promise for biomimicry in adhesion, specifically at the adhesive surface or adhesive joint.

One of the most interesting adhesive traits of biological climbers is the rapid speed at which the adhesion can be turned on and off (a necessity for locomotion). Reproduction of the on-off behavior would open a relatively unexploited industrial niche (a switchable adhesive) and is therefore of considerable interest. Many switching mechanisms have been considered by others, some of which are quite complex, but few manage to reproduce all of the performance seen in biological systems. The gap between industry and Nature suggests that a fundamental understanding is still lacking and further study is warranted.

Geckos are known to achieve their switching feat with a remarkably primitive mechanism. The Gecko simply peels its adhesive digits off a substrate. In simple terms, even biological sophistication has not found a way to beat the rudimentary mechanics that dictate a dramatic drop in adhesive force as the peel angle is increased towards 90°. It is this somewhat plain observation that serves as at least one motive for the devices, methods and systems of the present disclosure. What follows is further development of the concepts of the present disclosure through experimentation.

Sample Preparation

In one aspect, adhesive samples were created from a commonly used commercial silicon elastomer (PDMS-Dow Corning, Sylgard 184). A prepolymer and cross-linker were mixed in various ratios in order to create samples of varying modulus but of similar surface chemistry. Once mixed, the polymer was poured into polystyrene molds and placed in a leveled vacuum oven for degassing and annealing. Similar to varying the crosslinker concentration, changes in annealing conditions influenced the ultimate modulus of the elastomer. Typically a 10:1 ratio was used, and samples were annealed for 90 minutes at 85° C. and cooled to room temperature overnight. The modulus of a pure PDMS sample prepared in this manner was typically 1.5 MPa. Cured samples were cured, pulled from the vacuum oven and cut into square adhesive pads for characterization.

Composite samples were also prepared in order to increase modulus beyond that possible by modifying crosslinker ratios and to additionally add a magnetic—handle—to the materials. Similar PDMS samples were prepared; however, as cross-linker was added a metal filler was also added. In one aspect, one of the 3 particles were used as filler, a ~44 μm diameter iron powder (Sigma-Aldrich, USA), a ~150 μm diameter nickel powder (Sigma-Aldrich, USA) and a ~100 μm nickel powder (Sigma-Aldrich, USA). All powders were used as received. Since little or no variation was observed, the focus was on the iron particles. The filler concentrations were varied as 0:1, 1/16:1, 1/8:1, 1/6:1, 1/4:1, 1/2:1, 1:1, 2:1 reinforcement to polymer by weight.

SEM was performed on cross-sectioned samples of adhesive in order to observe the particle dispersion and/or layering of the reinforcement inside the polymer matrix. The polymeric-metal adhesive samples were sectioned with a razor blade and gold coated before being mounted on a sample chuck. A JEOL JSM-6490L V high-performance variable pressure SEM was used for observing the samples.

Lap Shear Testing

Figure 3:
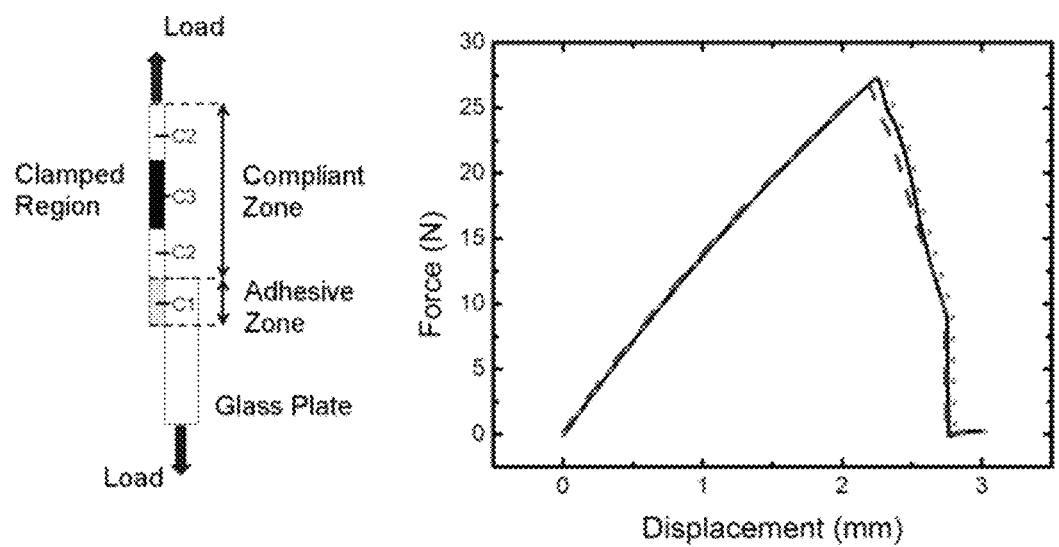
FIG. 3 is a pictorial representation of geometric details of a lap-shear adhesion test in accordance with an illustrative embodiment.

Adhesive force was measured in a lap-shear geometry as outlined in FIG. 3, on a model 5567 Instron. Force-displacement data was recorded as the heads were displaced at a constant rate. A rate of 5 mm/min was used throughout this study in order to conduct tests in a reasonable time. No significant differences were observed in comparison to slower rates. Samples were deemed to have failed once a complete reduction in the glass/sample contact area occurred. Before performing a measurement, an adhesive sample was cleaned with masking tape to remove dust and the substrate is cleaned with acetone.

During the setup of a lap-shear test, an adhesive sample is clamped in the upper grip and then bonded at zero degrees to a glass substrate that is fixed to a lower grip. Ensuring sample-substrate parallelism is critical during this step in order to eliminating unwanted moments and force concentrations. Each sample was then adhesively bonded to a fixed glass plate at a given overlap and a predefined gage length. In one aspect, the overlaps was 15 mm, 10 mm, and 5 mm, with compliant zone lengths being 20 mm, 25 mm, and 30 mm respectively. The contact area was observed during testing and the initiation of failure was noted during each test. Each measurement described below consisted of testing with a clamp, both on and off, three times (n=3), and error shown is the standard deviation of the three tests.

Ultimately, the load-displacement curves provide the critical force for failure. $F_C$ and the time to complete failure, $t_f$. An approximate crack velocity can be calculated from the time to fail given the macroscopic contact area. Additionally, the slope of the force-displacement curve gives the inverse of the system compliance (assuming the material is Hookean). The system compliance contains contributions from both the sample as well as the instrument itself. In the testing, the sample compliance is considerably larger than the instrument compliance, and no attempt was made to remove instrument effects from a measurement.

Composite Adhesion

The adhesive force capacity of neat and composite samples was tested in a clamp-free lap shear test (See FIGS. 4A-D). As anticipated, the different materials show varying force capacities and compliances despite having similar contact area and contact chemistry. Notably, the highest force was recorded for the highest density composite. Scaling the force by the peak force, $F_C$ and the position axis by the extension at failure, $x_C$, a complete collapse of all data onto a master curve is observed. The collapse highlights the linearity of the materials over the range of test conditions, and that the ratio $X_C/F_C$ (i.e., compliance) is a particularly relevant material scale in the problem.

Adhesive failure in a lap-shear geometry is generally governed by a balance between three relevant energies: surface energy, elastic energy, and work due to the applied load. The distance the load moves is determined by the energy storage during the extension of the free 'compliant zone' of a sample, ultimately yielding a contribution $CF^2$ of to the balance. This is nearly identical to the energy stored in the extended region itself given by $\frac{1}{2}CF^2$. The surface term is given by $G_C A$, and with the assumption of an unstable and complete failure of contact a trivial rearrangement gives Eqn. 1 above. In the experiments the maximum strains in the 'compliant zone' remain below 5%, minimizing viscoelastic losses and our test speeds are intentionally kept low enough to ensure that crack propagation occurs much faster than sample extension.

Figure 4A:
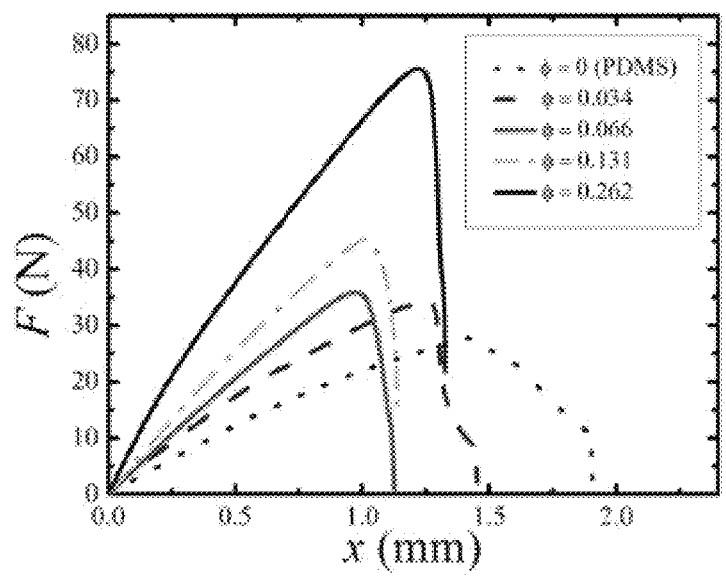
FIGS. 4A-D are pictorial representations of plots characterizing force capacity and compliance for one or more illustrative embodiments.
Figure 4B:
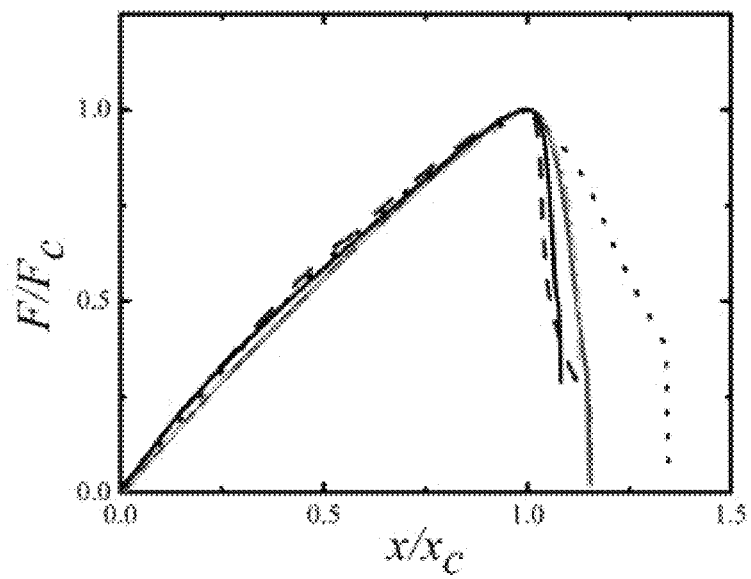
Figure 4C:
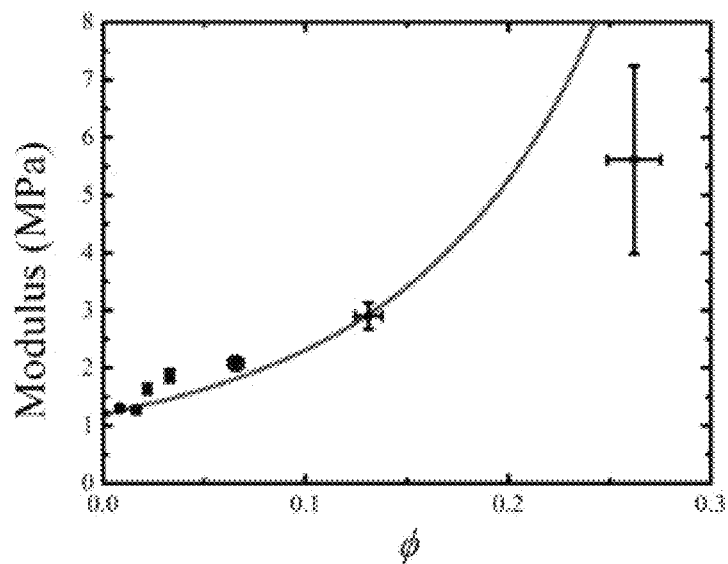
Figure 4D:
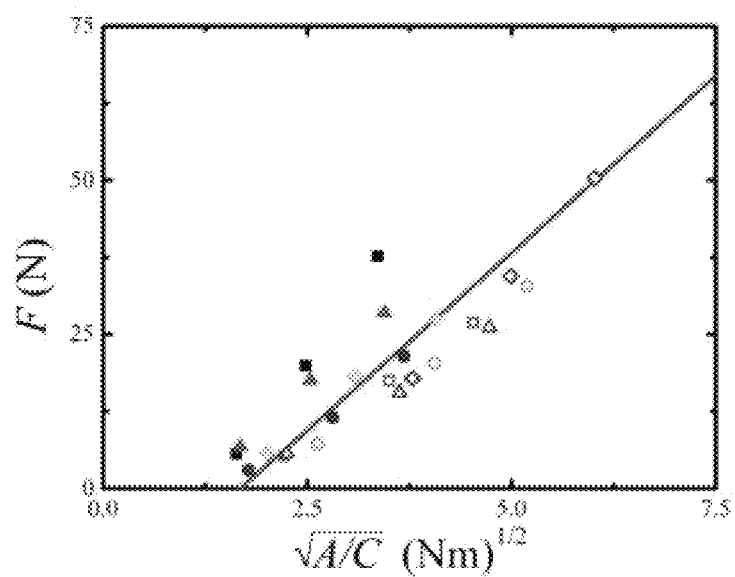
Figure 5A:
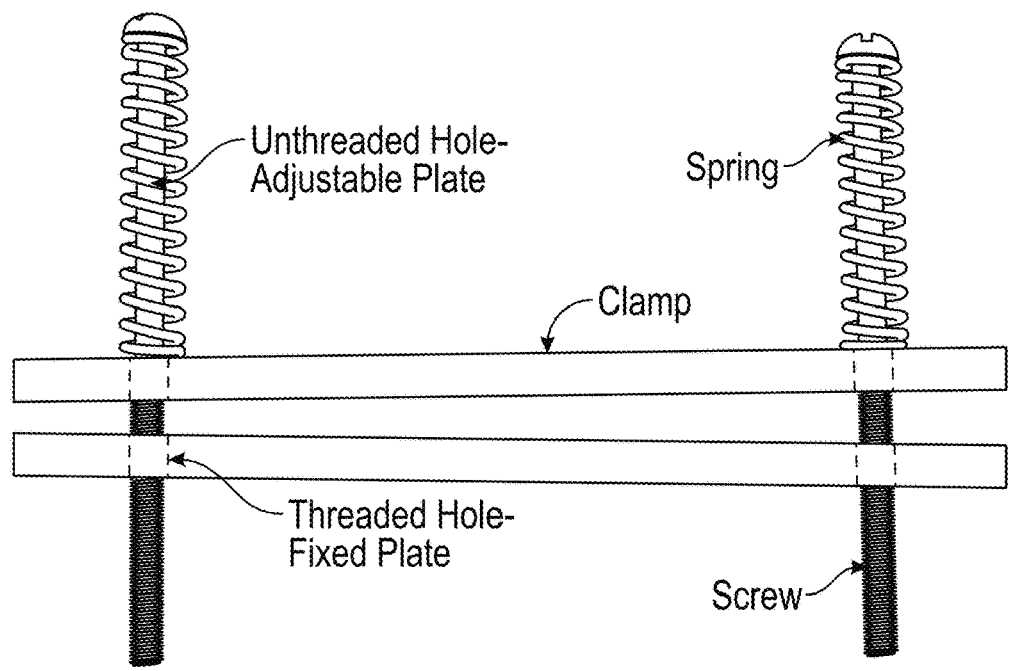
FIGS. 5A-B are pictorial representations of a clamp and adhesive sample test in accordance with an illustrative embodiment.
Figure 5B:
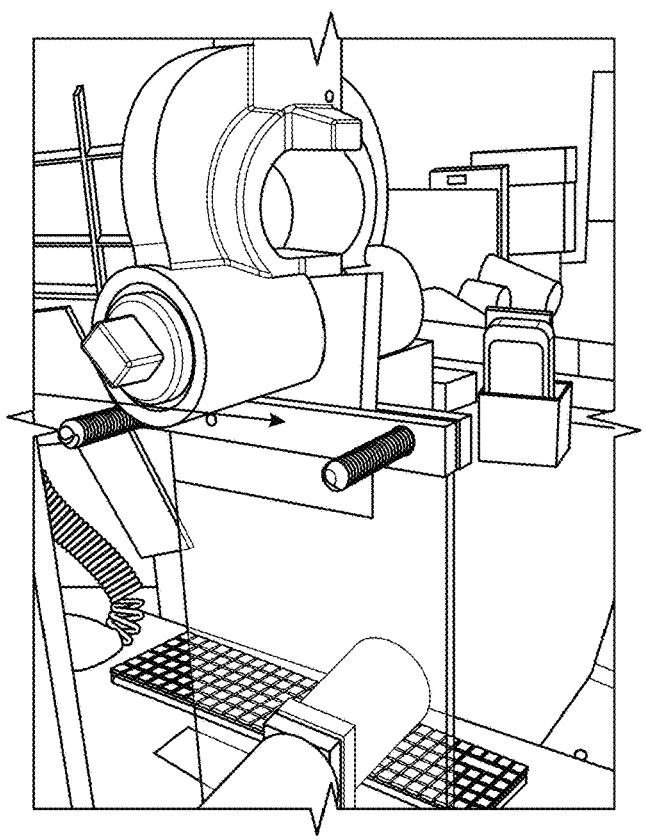

FIG. 4D shows critical force values for the composite samples taken at three different values of adhesive contact area plotted as a function of $\sqrt{A/C}$. Each datum indicates the average of at least 3 different force-displacement measurements, the standard deviation of which is too small to be visible on the plot. While the data has some scatter in the absolute force scale, each sample shows a clear linear trend, and all samples show a similar slope. The linearity is consistent with Equation 1, allowing the slope to be interpreted as $\sqrt{G_C}$. An average linear fit to all data is shown as a solid red line in FIG. 5D. The average slope is 9±1 corresponding to a $G_C$ value of 81 N/m. The similarity of slopes for each composite created verifies that there is no significant change in surface interaction due to iron particle loading.

The devices, systems and methods of the present disclosure are configured to manipulate the compliance of an adhesive system 10. Compliance generally describes the relative mechanical softness of an object, which can be due to material properties or geometric properties. If the assumptions behind the derivation of Eqn. 1 are satisfied, then the compliance of an adhesive device is just as important to its performance as is its chemistry and the amount of surface contact in the bond or at the adhesive joint. Thus, compliance can be a versatile form of adhesive switching. The generality of the idea is such that there are countless possible switching methods or mechanisms 28 as discussed and contemplated.

In particular, a lap-shear geometry is used experimentally to demonstrate how immobilizing a soft material leads to decreased compliance and increased adhesive force capacities. As an example, a clamp is used to directly immobilize part of our adhesive, a Polydimethylsiloxane/iron composite, effectively decreasing its freely deformable length and consequently increasing its stiffness. Notably, the contact area and the interfacial energy of the contact region are not changed during this experiment. The measurements are consistent with Equation 1 verifying its broad range and usefulness as a guide for adhesive switching designs.

Results

Mechanical Clamping

A simple mechanical clamp was fabricated and implemented to directly control compliance (See FIGS. 4A-B). The mechanical clamp includes of two bolts, two springs (k=2 N/mm), and two 13.5 by 80 mm aluminum clamp faceplates. The clamp faceplate touching the spring is free to move along the bolts, allowing the applied force to be controlled by adjustment of the bolts. By measuring the number of turns applied to the bolts, the springs could be accurately compressed within a hundredth of a millimeter, allowing a considerable degree of control over the clamping pressure. In one aspect, a pressure of 64 KPa is used in order to match the pressure applied by the magnetic clamping.

Magnetic Clamping

Magnetic clamping is contemplated as one method to switch compliance or as one switching mechanism 28 for the switchable body 16. For example rare earth magnets were placed on the face of an iron loaded composite adhesive film, or were placed symmetrically on both faces of a sample. The magnetic force pulls the magnet into contact with the material in an analogous manner to the spring in the mechanical clamp. In principle this can be done with an electromagnet, facilitating a literal push button adhesive switch, however, to simplify the experiment the constant force of the rare earth magnets is used. In order to directly compare pressures between the mechanical and magnetic experiments, force-displacement curves were measured for the magnets used in the experiments, and the screws were adjusted to mimic the magnetic pressure.

Mechanical Compliance Switching

A primary object of the disclosure is to both prove the concept and exploit compliance as a method of switching adhesion between a low and high force capacity using a switching mechanism 28 functioning in back of or behind an adhesive layer in a switchable body 16 or surface. The dominance of the 'compliant zone' in the geometry allows for a focus on a relatively simple scaling relation:

$$C = L/twE \qquad (2)$$

The modulus itself is an interesting target, but here the focus is on the conceptually simpler geometric contributions. In particular, the length of the compliant zone is modified. To demonstrate the principal, a region of the compliant zone was rigidly clamped, effectively stopping the region under the clamp from moving and storing elastic energy. Energy storage is therefore focused on the remaining free material, and the compliance is directly altered.

Figure 6A:
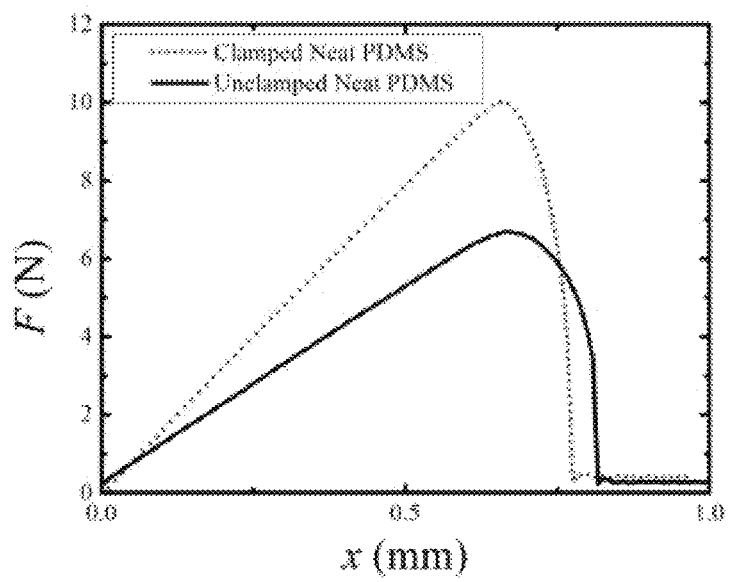
FIGS. 6A-B are pictorial representations of plots characterizing test results in accordance with an illustrative embodiment.
Figure 6B:
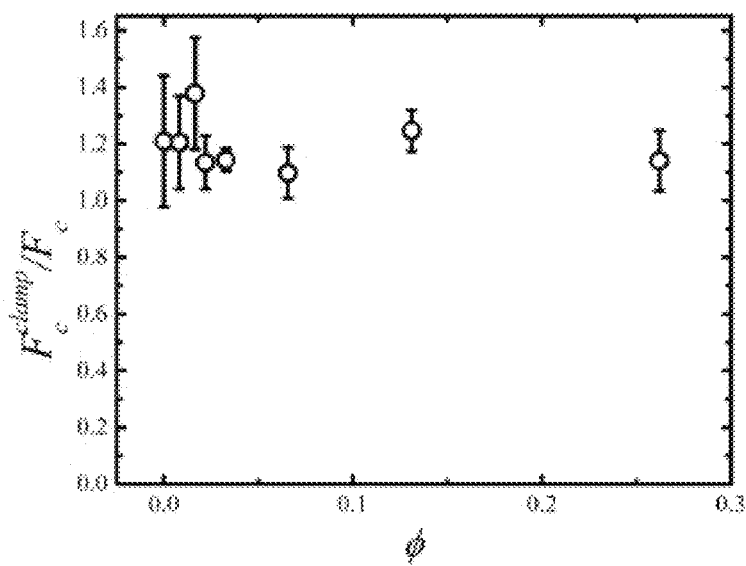

FIG. 6A shows a force displacement curve for a neat sample with and without rigid clamping. The test shows a clear difference in force capacity and compliance, with the clamped sample showing a larger peak force and smaller compliance. No deviation from the high-low force capacity change with the tilled samples were found, despite their differences in modulus. The ratio of clamped force capacity, $F_C^{clamp}$ to unclamped capacity. $F_C$, is a good indicator of the trend (See FIG. 6B). All samples show a 20% gain in peak force with the addition of the clamp.

Figure 7:
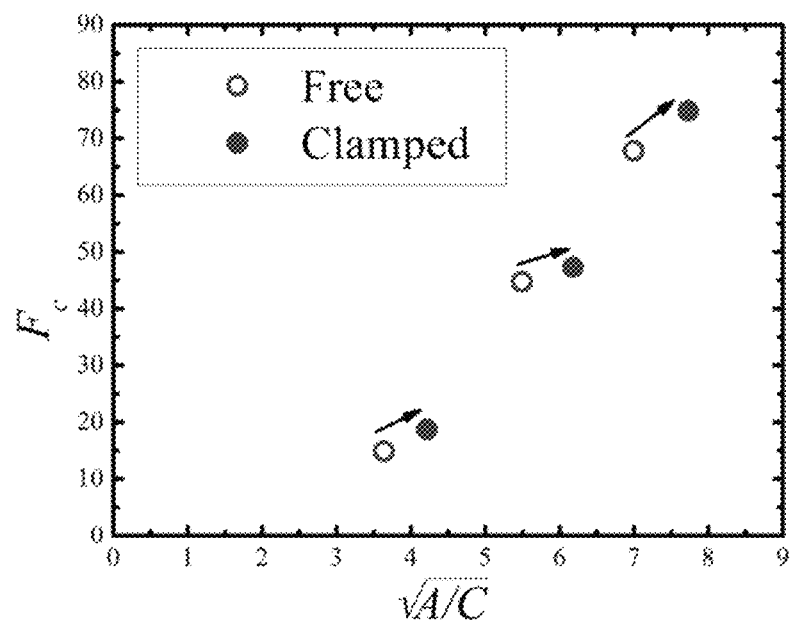
FIG. 7 is a pictorial representation of a plot characterizing test results in accordance with an illustrative embodiment.

The gain in force occurs in concert with a proportional decrease in compliance, as predicted by Equation 1. This fact is demonstrated in FIG. 7, where $F_C$, is plotted against $\sqrt{A/C}$ (only the most heavily loaded sample is shown for clarity). Data for clamped and unclamped samples both maintain the predicted scaling with clamped samples shifting along the curve to larger forces and larger $\sqrt{A/C}$. Once again $G_C$ does not appear to significantly change with the addition of the clamp.

The length of the clamp (13.5 mm) coupled with the geometric scaling given by Equation 2 allows an estimate of the magnitude of the shift in compliance upon addition of the clamp. For example, a ratio of clamped compliance to unclamped compliance is predicted to be ~1.8. In close agreement taken measurements give an average value of 1.5±0.1. In terms of the adhesive force ratio the prediction becomes ~1.3, again close to what is observed in FIG. 6B.

Magnetic Compliance Switching

The mechanical clamp demonstrates, in a simple manner, the usefulness of compliance control as a route to control adhesive switching, and more specifically the switching mechanism 28 of the switchable body 16. The effect is shown to be independent of the modulus of the adhesive even in iron/PDMS composites. A mechanical clamp can be cumbersome and of limited usefulness; however, a composite material is not just the mechanical sum of two materials. Inclusions can serve various additional rolls enhancing the composites performance by adding additional material properties (conductivity, color, refractive index, etc. . . . ). In this case, iron is a ferromagnetic material and will respond to a magnetic field, in effect adding a magnetic 'handle' to every element of material.

Figure 8A:
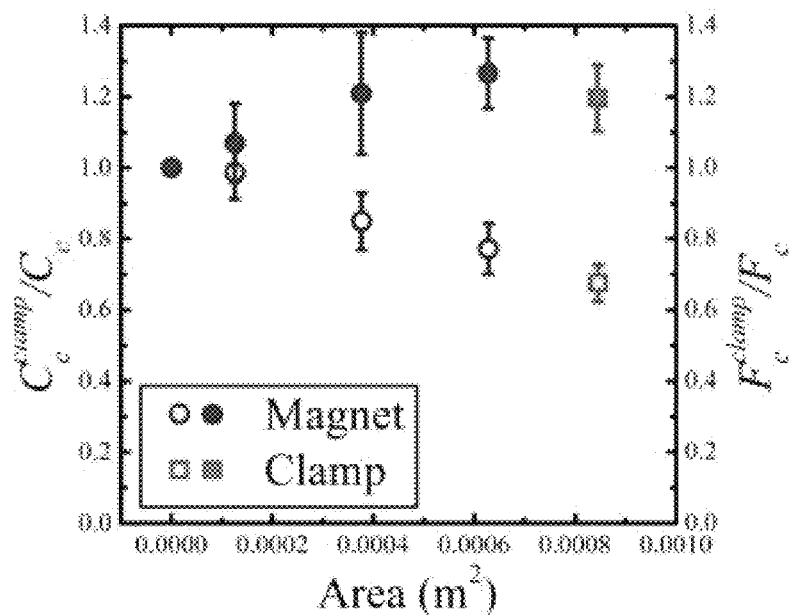
FIGS. 8A-B are pictorial representations of plots characterizing test results in accordance with an illustrative embodiment.
Figure 8B:
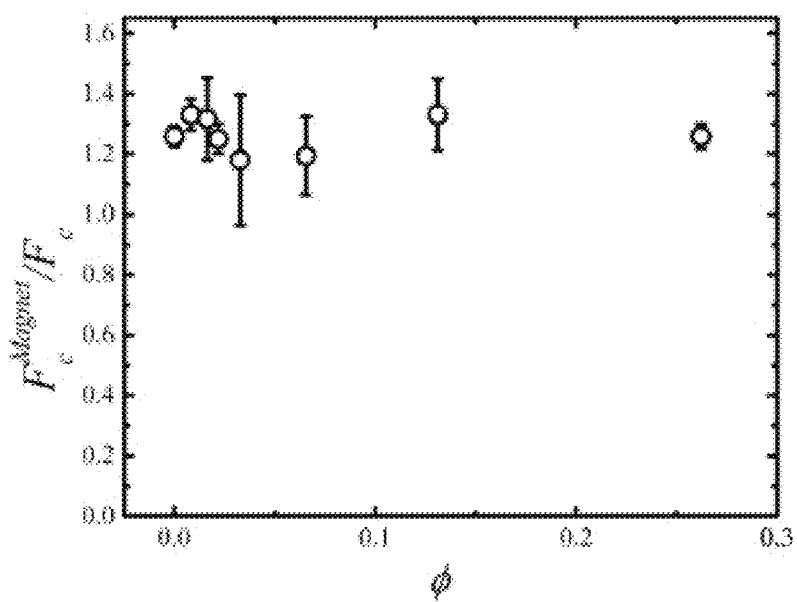

To exploit the ferromagnetic handle as one device, method or system of the present disclosure, stacks of rare earth magnets are added to the compliant zone in order to immobilize material once again. FIG. 8A shows the change in compliance and peak force with the clamp 1 addition of the magnetic clamp. The ratio of $C_C^{clamp}/C_C$ is seen to monotonically decrease as more area is clamped with additional magnets (maintaining a similar pressure beneath each magnet). Similarly, the ratio of $F_C^{clamp}/F_C$ is seen to increase with increased clamping area. On the same axis we also show the mechanical clamp results, which qualitatively fit the overall trend. Notably, the force ratio was found to have little relation to the volume fraction of iron particles in the composite and was found to be slightly larger than with the mechanical clamp, $C_C^{clamp}/C_C=1.26\pm0.06$ (See FIG. 8B).

Figure 9:
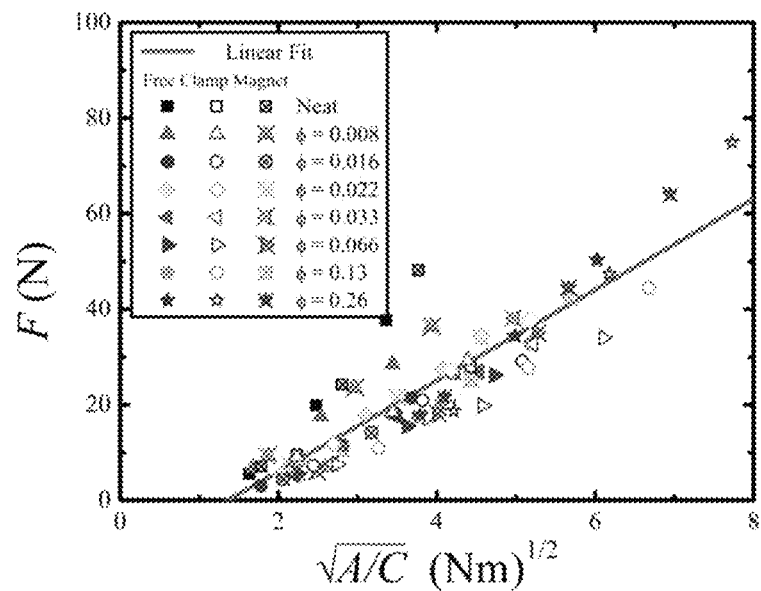
FIG. 9 is a pictorial representation of a plot characterizing test results in accordance with the illustrated embodiments.

FIG. 9 shows the critical force for failure for the clamped and clamp free adhesives as a function of $\sqrt{A/C}$. Again, it is found that the data shows a linear trend with a slope of 9.5±0.5, corresponding to an approximate value of $G_C$~90 N/m similar to the earlier fit. While this scaling estimate is not an exact measurement of the PDMS/Glass interfacial energy it is remarkably similar to other published values (given a reasonable estimate of the crack propagation speed from $t_w$). For example, the neat PDMS shown in FIG. 6, has an estimated crack speed of ~3 mm/s. Published test adhesion values between a spherical glass lens and the similar neat PDMS used here give $G_C$~70 N/m for this range of speeds.

The present disclosure is not to be limited to the particular embodiments described herein. In particular, the present disclosure contemplates numerous variations in the type of ways in which embodiments of the disclosure can be applied to the devices, methods and systems of the present disclosure. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all of the intended objectives.

The previous detailed description is of a small number of embodiments for implementing the disclosure and is not intended to be limiting in scope. The following claims set forth a number of the embodiments of the disclosure disclosed with greater particularity.

What is claimed is:

1. A switchable adhesion system, comprising:
   a switchable body comprising a switchable adhesion component; wherein the switchable adhesion component has one or more sides surrounding the perimeter of the switchable adhesion component, and wherein the switchable adhesion component and the one or more sides together form the switchable body;
   at least one surface of the switchable body comprises an adhesion surface adapted to carry a separate adhesive layer, wherein the switchable body further comprises a second surface opposite the adhesion surface, and wherein the second surface is adapted to carry a load;
   wherein only a portion within the switchable body includes an adhesion switch adjustable between one or more varying states of stiffness, which when the adhesion switch is activated, limits deformation changes from occurring in the adhesive layer;
   wherein the adhesion surface is planar in the one or more varying states of stiffness of the portion of the switchable body.

2. The switchable adhesion system of claim 1 wherein the second surface of the switchable body opposite the adhesion surface comprises a load carrying surface adapted to carry the load.

3. The switchable adhesion system of claim 1 wherein the varying states of stiffness in the switchable body correspond with one or more varying states of force capacity at the adhesion surface.

4. The switchable adhesion system of claim 2 wherein the portion of the switchable body switchable between one or more varying states of stiffness is disposed between the adhesion surface and the load carrying surface.

5. The switchable adhesion system of claim 1 wherein the portion of the switchable body having the adhesion switch is disposed at the adhesion surface.

6. The switchable adhesion system of claim 2 wherein the portion of the switchable body having the adhesion switch is disposed at the load carrying surface.

7. The switchable adhesion system of claim 3 wherein the varying states of force capacity comprise varying the stiffness of the switchable body to alter the constraint imparted to the adhesive layer.

8. The switchable adhesion system of claim 7 wherein the greater the stiffness of the switchable body, the greater the constraint imparted to the adhesive layer, and the lesser the stiffness of the switchable body, the lesser the constraint imparted to the adhesive layer.

\* \* \* \* \*